United States Patent Office 2,787,138
Patented Apr. 2, 1957

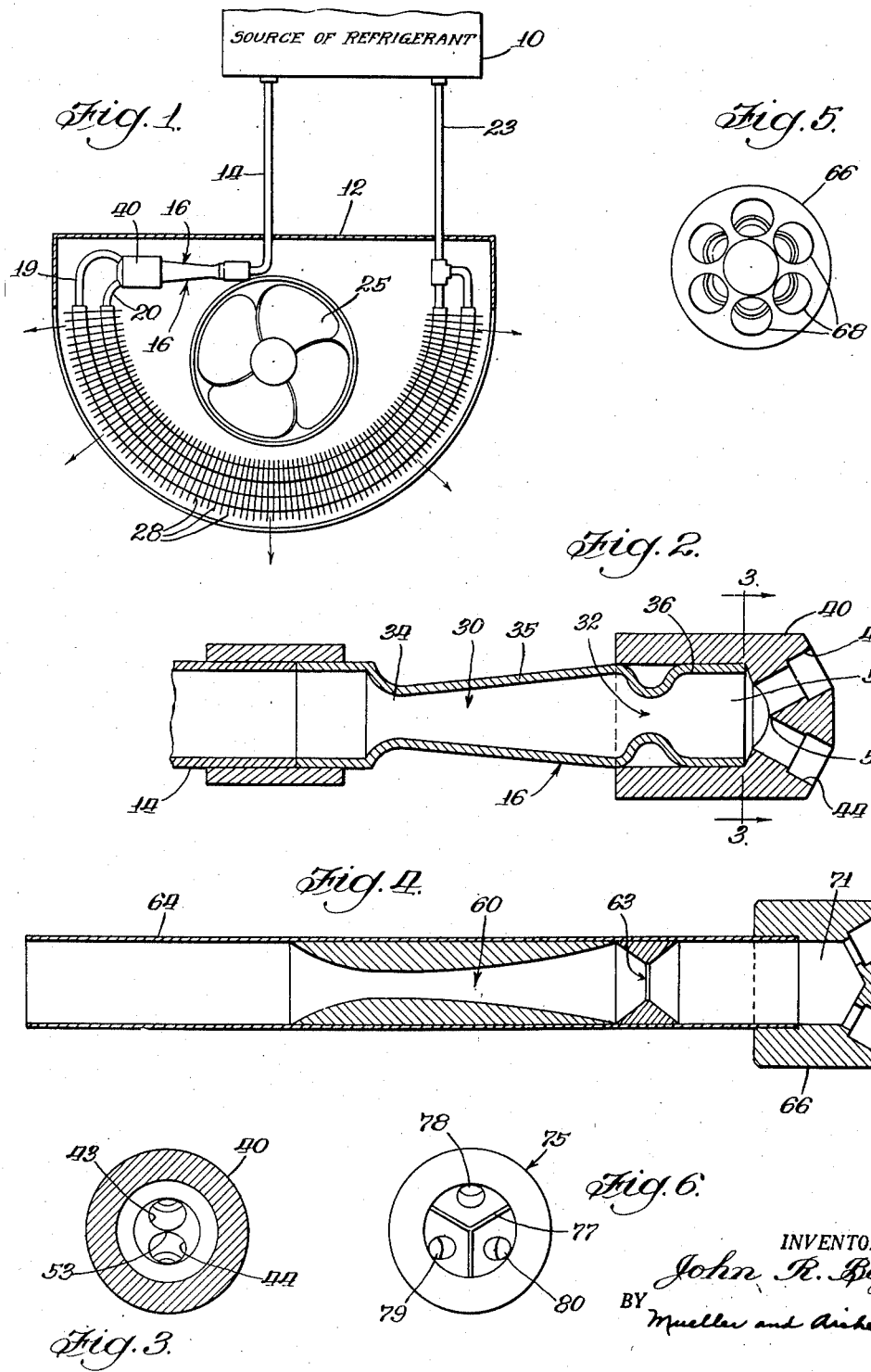

2,787,138
FLUID MIXING DEVICE

John R. Boyle, Chicago, Ill., assignor to Betz Corporation, Hammond, Ind., a corporation of Indiana Application April 18, 1955, Serial No. 501,771

3 Claims. (Cl. 62—126)

This invention relates to fluid distributors of a type useful in the mixing and distribution of two liquids or a liquid and gas.

There are various instances in which it is necessary to evenly mix and distribute fluids. For example, it may be desired to combine into a homogeneous mixture oil and water, steam and water, air and water, etc. One important application for such a fluid mixer is in refrigerating systems.

In one form of refrigeration system, it is usual to compress the refrigerant and to allow the same to expand in a heat exchanger during which time it absorbs heat from surroundings to effect the desired cooling. In some of the systems, it is necessary to introduce the expanding refrigerant into more than one channel or circuit of a heat exchanger. Thus, a distributing device must be used to allot equal amounts of refrigerant to the separate circuits in order that they may all cause cooling to a similar degree. However, the distribution problem is complicated by the fact that the expanding fluid, as it emerges from an expansion valve or the like, may be in two physical states, namely liquid and gas. Therefore, provision must be made for securing a homogeneous mixture before distributing the fluid to the system.

It is known in the art to employ a Venturi section for mixing fluids without unwanted pressure drops, but to obtain optimum mixing, considerable velocity change and correspondingly long lengths of the Venturi section are necessary. An orifice may also be used for mixing fluids, but this may cause an unwanted pressure drop. It should also be pointed out that the effectiveness of either of these devices varies considerably over differing fluid conditions and that they do not function equally well in all positions.

It is an object of the present invention to provide an improved device for mixing two or more fluids into a homogeneous mixture and distributing such mixture equally to a plurality of separate circuits without substantial pressure loss.

Another object of the invention is to provide a fluid mixer and distributor of small size and inexpensive construction which operates in any position to mix and distribute a fluid in two physical states to a plurality of circuits.

Still another object is to provide a fluid mixer and distributor for a refrigerant which operates effectively over a wide range of refrigerant conditions.

A feature of the invention is the provision of an improved mixer of fluid including a Venturi section and an orifice section series connected, with the orifice section supplementing the mixing action of the Venturi section.

Another feature of the invention is the provision of a fluid mixer and distributor comprising Venturi and orifice sections for mixing fluid in two physical states and an apertured distributing head for dividing the mixed fluid and supplying the same to a plurality of circuits. The distributing head may include a partition between the apertures therein to improve the distribution in an application where there are but few circuits.

Further objects, features and the attending advantages thereof will be apparent upon consideration of the following description of specific embodiments of the invention as used in refrigerating systems. The description is made in reference to the drawing in which:

Fig. 1 shows a refrigerating system utilizing the invention;

Fig. 2 is a sectional view of the mixer and distributor;

Fig. 3 is a cross section along the lines 3—3 of Fig. 2;

Fig. 4 is a sectional view of an additional embodiment of the invention;

Fig. 5 is an end view of the unit of Fig. 4; and

Fig. 6 illustrates another embodiment of the invention.

The present invention includes a fluid mixing and distributing device suitable for use in a refrigerating system where it is necessary to distribute the refrigerant which may be in two physical states in a uniform manner to a system comprising a plurality of heat exchanger circuits. The device, which is adapted to be coupled to expansion apparatus in the system, consists of a Venturi mixing section and an orifice mixing section. The refrigerant may, therefore, be mixed first by the Venturi section and then further mixed by the orifice section, after which an apertured head coupled to the orifice section is used to apply the mixed fluid to the plurality of circuits. When there are a small number of circuits and low pressure is desired across the mixer, even distribution of the fluid is further promoted by use of a divider or vane in the head to separate the apertures therein so that the fluid applied to the apertures is maintained in a homogeneous mixture as it is distributed to the circuits.

Fig. 1 shows a refrigerating system including a source of refrigerant 10 connected to an evaporator heat exchanger 12. The source of refrigerant 10 is understood to include suitable compression apparatus and an expansion valve which supplies the expanding fluid to line 14 connected to the mixer and distributor device 16. Device 16 then may apply the refrigerant to the separate heat exchanger circuits 19 and 20, which are returned to the source of refrigerant 10 by means of line 23.

Cooling, or heat exchange, takes place through the forcing of air by fan 25 over the fins 28 which are in heat conductive relation to the circuits 19 and 20. As is familiar to those in the art, the source of refrigerant 10 compresses a suitable refrigerant, removes some of the heat therefrom, and by means of an expansion valve (not shown) permits the compressed fluid to expand so that it may be applied to the device 16 for distribution to the circuits 19 and 20, where it absorbs heat from the surroundings.

It has been found that the compressed refrigerant, in passing through the expansion valve, is often reduced to a fluid at lower pressure in two physical states, that is, the fluid in line 14 may consist of both gaseous and liquid refrigerant. Accordingly, the mixing and distributing device 16 is used to effect mixture of the fluid into a homogeneous condition and to distribute it evenly between the circuits 19 and 20.

The mixing and distributing device shown in section in Fig. 2 may be seen to consist of a Venturi section 30 connected to line 14 and an orifice section 32 coupled to the Venturi section. Venturi section 30 is comprised of a smoothly-rounded, restricted portion 34 which enlarges gradually into a flared portion 35 having a maximum diameter approximately equal to the size of the tubing entering the restricted portion 34. The orifice section as shown consists of a sharply restricted portion 32 immediately adjacent the flared portion 35. There is a portion 36 immediately following orifice section which forms part of chamber 50.

An apertured head 40 which fits over the end of the device 16 extends back and surrounds the outside of the orifice section 32 in order to improve the strength of the device at this section. Apertures 43 and 44 are formed in the end of head 40, and these apertures may be counterbored in order to accept the tubing forming circuits 19 and 20. Additional apertures are added, depending upon number of circuits required. As is apparent from Figs. 2 and 3, the interior of the head 40 and portion 36 of mixing device 16 form a chamber 50 between the mixing portion of the device and the apertures 43, 44 in the head. The apertures 43 and 44 extend inwardly to communicate with chamber 50 at an acute angle with respect to one another, and this forms a sharp partition or point 53 between these apertures. With two apertures, part 53 is a sharp partition and with three or more apertures, part 53 is a point.

It may be seen that the device operates by applying the fluid, which may be in two physical states, to the Venturi section 30 which accomplishes a portion of the mixing operation after which it is applied to orifice section 32 for completing the mixing operation. The mixed fluid then is conducted to the apertures 43 and 44 which are in communication with the circuits 19 and 20 (Fig. 1). Partition 53 has been found to promote the distribution of the mixed fluid to such an extent that the device operates effectively with two apertures 43 and 44 in vertical relation as shown. This is a position in which efficient operation is most difficult to obtain, particularly with low pressure drop across the device, but the device operates effectively in other positions and with a greater number of apertures, also.

In a particular model of the invention, the following dimensions provided highly satisfactory operation:

| | |
|---|---|
| Outside diameter of tubing | ½ inch. |
| Length of Venturi | 1⅛ inches. |
| Maximum restriction of Venturi | .1875 inch. |
| Diameter of orifice | .200 inch. |
| Angle of Venturi flare | 7½ degrees. |
| Angular relation of the apertures in head 40 | 60 degrees. |

A mixer and distributor device constructed in accordance with these dimensions provided effective operation with refrigerating units having two, three and four circuits and of capacities from one-half to one and three-quarters tons (heat transfer of from 6,000 to 21,000 B. t. u.'s per hour) and a maximum pressure drop across the mixer-distributor device of approximately two pounds. Thus, it is apparent that the device operates effectively over rather widely varying fluid conditions. The dimensions given may, of course, be varied to provide efficient operation in other types of applications.

Fig. 4 illustrates another embodiment of the invention in which the Venturi section 60 and the orifice section 63 may be formed by suitable inserts within the tube 64. Head 66 shown coupled to tube 64 is shown in Fig. 5. It may be seen that this head includes five apertures which may be connected to an evaporator system of five circuits. The chamber 71 between the end of tube 64 and the aperture 68 need not contain a dividing partition when the distribution is to be made to a system comprising so many circuits. However, if the head 66 contains two or three apertures and the flow is in the low range, it would be desirable to employ separate partitions or vanes within chamber 71 to separate the apertures and promote even distribution of the mixed fluid. Fig. 6 illustrates the interior of a distributor head 75 with partition 77 dividing the three apertures 78, 79 and 80.

The invention provides, therefore, an efficient fluid mixer and distributing device which operates effectively over a wide range of conditions including the difficult distribution to a small number of heat exchanger circuits with the device in any position and with low pressure drop across the device. Furthermore, the device is of small physical size and may be inexpensively formed, for example, by the spinning of copper tubing in the case of the embodiment of Fig. 2. The invention has been described in connection with a refrigeration system, but it should be apparent to those in the art that it is equally adaptable for use in mixing fluids of other types, also.

I claim:

1. A fluid mixing and distributing device for conducting fluid having portions in liquid and gaseous states including in combination, a Venturi section having an inlet of a predetermined diameter for receiving the fluid, a restricted portion and a gradually flared outlet portion having a maximum diameter substantially the same as said predetermined diameter of said inlet, said Venturi section mixing the liquid and gaseous portions of said fluid, an orifice section coupled to said outlet portion of said Venturi section for further mixing said fluid portions, and distributing means coupled to said orifice section and having a plurality of apertures for connection to a plurality of circuits for distributing the mixed fluid thereto.

2. A fluid mixing and distributing device for conducting fluid having portions in liquid and gaseous states including in combination, an integral tubular member having formed therein a Venturi section and an orifice section, said Venturi section having an inlet of a predetermined diameter, a restricted portion, and a gradually flared outlet portion having a maximum diameter substantially the same as said predetermined diameter of said inlet, said orifice section having an inlet for receiving fluid from said Venturi section, said Venturi section and said orifice section mixing the liquid and gaseous portions of said fluid, and a distributing head coupled to said tubular member at the outlet of said orifice section and having a plurality of apertures for connection to a plurality of circuits for distributing the mixed fluid thereto.

3. A distributing and mixing device for conducting a fluid in two physical states from fluid expansion means to a plurality of circuits in an evaporator heat exchanger, said device including series connected Venturi and orifice sections for effecting mixture of the fluid in two physical states, said Venturi section being adapted to be coupled to the fluid expansion means, distributing means comprising an apertured head having an input chamber coupled to said orifice section and a plurality of apertures extending from said chamber and adapted to be connected to the plurality of circuits, and partitioning means dividing said input chamber of said head for distributing a substantially equal amount of mixed fluid to each circuit.

References Cited in the file of this patent

UNITED STATES PATENTS

| 1,739,161 | McKee | Dec. 10, 1929 |
| 2,082,403 | Larkin | June 1, 1937 |
| 2,670,011 | Bertin | Feb. 23, 1954 |